United States Patent [19]

Pilloud

[11] Patent Number: 4,504,705
[45] Date of Patent: Mar. 12, 1985

[54] RECEIVING ARRANGEMENTS FOR AUDIO FREQUENCY SIGNALS

[75] Inventor: Bernard Pilloud, Steinhausen, Switzerland

[73] Assignee: LGZ Landis & Gyr Zug AG, Zug, Switzerland

[21] Appl. No.: 455,642

[22] Filed: Jan. 5, 1983

[30] Foreign Application Priority Data

Jan. 18, 1982 [CH] Switzerland .......................... 262/82

[51] Int. Cl.³ .......................................... H04M 11/00
[52] U.S. Cl. .................................. 179/2.51; 179/2 R; 340/310 R
[58] Field of Search .............................. 179/2 R, 2.51; 340/310 R, 310 A, 310 CP

[56] References Cited

U.S. PATENT DOCUMENTS 1,672,940  6/1928  Honaman .
1,724,112  8/1929  Sindeband .
4,307,380  12/1981  Gander .......................... 340/310 R

FOREIGN PATENT DOCUMENTS 1322461  7/1973  United Kingdom .

Primary Examiner—Gene Z. Rubinson
Assistant Examiner—W. J. Brady
Attorney, Agent, or Firm—Ernest F. Marmorek

[57] ABSTRACT

A receiving arrangement is provided, to receive audio frequency signals that are transmitted by way of lines of an alternating current distribution network. The audio frequency signals are decoupled from a low or medium voltage level of the network. The currents in one or more phases in such level are detected and the signal is applied to a receiver. The audio frequency signals are decoupled by means of one or more current transformers or voltage transformers and currents or voltages in secondary windings of signal transformers connected thereto are detected. Each secondary winding of the signal transformers with the ohmic resistance thereof and the load resistance thereof, forms a high-pass filter with the lowest frequency to be transmitted as its lowermost frequency. The signal transformer cooperates with an amplifier, summing or subtracting circuit in the receiving circuit.

11 Claims, 5 Drawing Figures

RECEIVING ARRANGEMENTS FOR AUDIO FREQUENCY SIGNALS

BACKGROUND OF THE INVENTION

This invention relates to receiving arrangements for audio frequency signals transmitted by way of lines of an alternating current (a.c.) distribution network.

Such receiving arrangements may for example be used in installations for the automatic transmission of information to a central answering station, such information being collected by meter condition detecting devices disposed in a low-voltage level of the network. In principle, such a central station may be disposed in the same voltage level of the network as transmitters in the detection devices. Since at least in larger-size networks, the central answering stations are at a higher voltage level of the network, in particular at a medium voltage level, in order to ascertain the maximum number of counter conditions, the signals must transfer the information by way of distribution transformers between the two voltage levels and must be decoupled from the higher network level.

U.S. Pat. No. 4,307,380 describes a receiving arrangement for audio frequency signals wherein a wide-band audio frequency signal is received by coupling to an a.c. distribution network, freed of noise components by a noise filter, and fed to evaluation chains. Such receiving arrangements are intended for a system in which the signal frequency alters within a pulse in a predetermined manner.

U.S. Pat. No. 1,724,112 discloses a system for transmitting information by means of audio frequency signals, over a multi-phase network, wherein as shown in FIG. 7 thereof, signals are decoupled from two phases of the low voltage level, the detected currents going in the opposite direction.

Finally, G.B. Pat. No. 1,322,461 discloses a ripple control process with wide-band signal transmission (signal spectrum of up to several hundred Hz) by way of lines of an a.c. distribution network, by the pulsed superimposition of audio frequency oscillations. The length of the superimposed pulses is within a range which is defined by an eighth of a period and a full period of the network a.c. voltage. The associated receiver uses a high pass filter, with a comb filter disposed downstream thereof, for filtering out harmonics of the network voltage.

In the previously known procedure for decoupling audio frequency signals to be evaluated from any network voltage level, the arrangement used a transformer together with filters, which requires a considerable amount of expenditures on technical equipment and tuning operations.

According to the invention there is provided a receiving arrangement for audio frequency signals transmitted by way of lines of an alternating current distribution network, wherein a receiver is connected by means of at least one signal transformer to a secondary circuit of at least one transformer which is provided in the alternating current distribution network, and the signal transformer is formed as a high-pass filter.

A preferred receiving arrangement embodying the invention and described hereinbelow has the advantage that the receiver is of a simple design and that conventional economical individual components can be used for the signal decoupling action and a signal transformer which is required in any case, such components permitting a double function without additional expensive passive filter components which occupy a large amount of space. Some individual components can also be used for other purposes, thereby making savings on technical equipment. Finally, the preferred arrangement is preferably suitable for the above-mentioned wide-band signal transmission system of U.S. Pat. No. 4,307,380.

The invention will now be further described, by way of illustrative and non-limiting example, with reference to the accompanying drawings.

DESCRIPTION OF THE PREFERRED EMBODIMENTS

Figure 1:
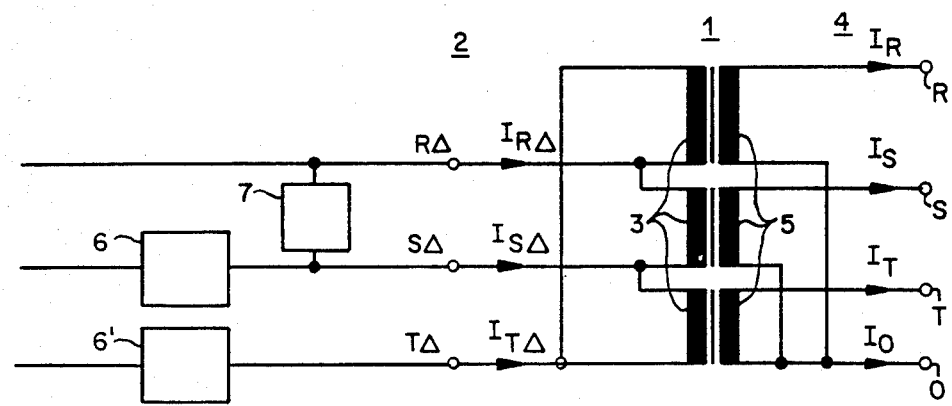
FIG. 1 shows a distribution transformer with couplings thereto.

FIG. 1 shows an arrangement for coupling to a higher network level of an a.c. distribution network, for example, a medium voltage level 2, which is connected by way of a distribution transformer 1 to a low voltage level 4 of the network. It will be appreciated that coupling can also be made directly to a low voltage level 4, in the same manner.

From the low voltage level 4, audio frequency signals which are superimposed into that level are transmitted by means of windings 5 of the transformer 1 to windings 3 in the higher (medium) voltage level 2. One or more lines of the medium voltage level 2 may include a respective current transformer 6, or one or more voltate transformers 7 may be provided between a plurality of lines in that level, for decoupling the signals.

To permit the understanding of an embodiment of the invention described hereinbelow, the distribution transformer 1 shown in FIG. 1 will first be described, together with the associated phase currents. In order to explain the principle involved, a simplification will be employed: namely, it will be assumed that the transformer 1 is an ideal transformer. Accordingly, the inter-relationships of the individual phase currents also apply in regard to the signal currents which are to be transmitted by way of the network, against the flow of energy, and which are significant for example, for consumption meter conditions which are to be transmitted.

Power supply networks in Europe generally use three lines in the medium voltage level 2 and four lines in the low voltage level 4. Therefore, the transformer 1 has delta-connected windings 3 on the medium voltage side 2 and star-connected windings 5 on the low voltage side 4. On the low voltage side 4, the network currents of the individual phases R, S and T, and the current in the neutral line 0 which is connected to the center point of the star, are related in the following manner:

$$I_R + I_S + I_T = I_0 \tag{1}$$

where the indices denote the individual phases or the neutral line.

The currents on the medium voltage side 2 add up to zero:

$$I_{R\Delta}I_{S\Delta}+I_{T\Delta}=0 \tag{2}$$

The currents on the medium voltage side 2 of the transformer 1 are related in the following manner to the currents on the low voltage side 4:

$$I_{R\Delta}=(I_R-I_S)k \tag{3}$$

$$I_{S\Delta}=(I_S-I_T)k \tag{4}$$

$$(I_T-I_R)k \tag{5}$$

where k is the transformer constant.

An audio frequency signal which is coupled in on a phase of the low voltage network 4, and which has a frequency range of between 1 and 25 kHz, in particular a wide-band signal, appears only at a short distance (a few km) predominantly on one phase of the medium voltage level 2. At greater distances, the signal is distributed between all three phases, but to unequal degrees. It will be seen from equations 3 to 5 that, in that case, each individual one of the currents $I_{R\Delta}$, $I_{S\Delta}$ and $I_{T\Delta}$ of the medium voltage level 2 is defined by the currents of at least two phases of the low voltage level 4.

Thus, when there are short distances between a transmitter in the low voltage level 4 and a receiver in the low voltage level 4 or in the medium voltage level 2, decoupling of the audio frequency signals may be effected by means of a single current transformer 6 in a single phase of the respective network level. In that respect, the most effective phase for producing the decoupling action has to be ascertained. When dealing with longer distances, particularly in the medium voltage level 2, the arrangement should use a plurality of current transformers 6, 6' or voltage transformers 7, between a plurality of phases, as will be described in greater detail hereinafter.

Figure 2:
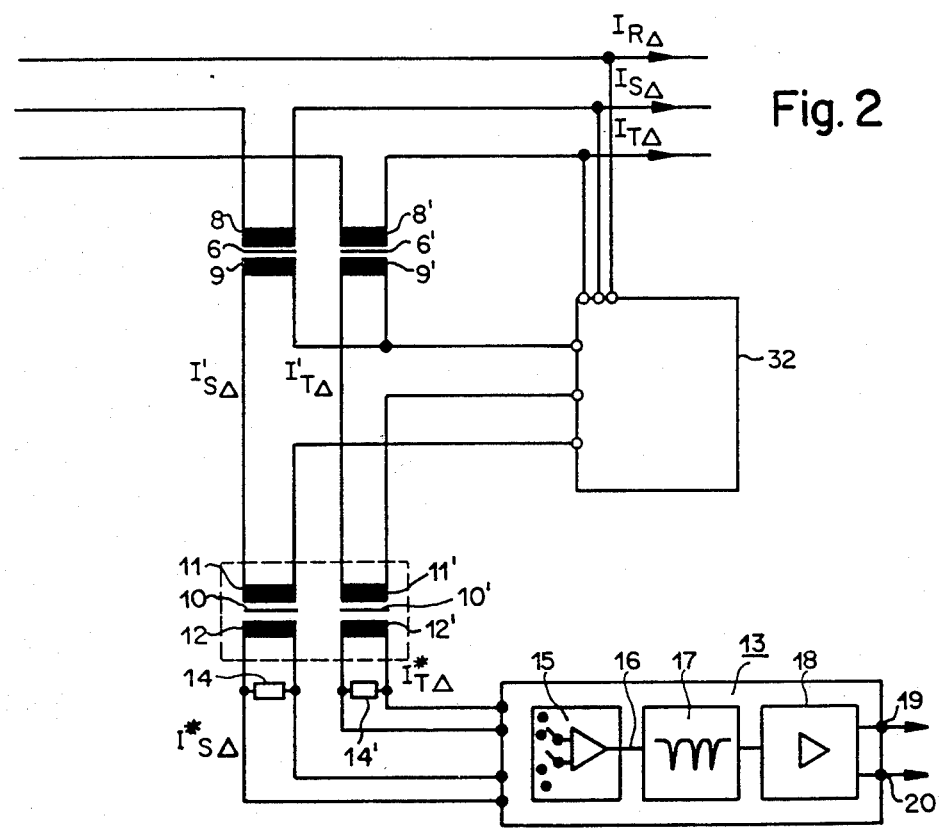
FIG. 2 shows an arrangement for decoupling from a plurality of network phases of a medium voltage network.

The means for decoupling an audio frequency signal from a plurality of network phases of a medium voltage level 2 comprises, as shown in FIG. 2, two current transformers 6 and 6'. The phase current $I_{S\Delta}$ and $I_{T\Delta}$ flow through primary windings 8 and 8', respectively, of the transformers 6 and 6'. The currents $I'_{S\Delta}$, $I'_{T\Delta}$ in secondary windings 9 and 9' of the transformers 6 and 6' flow through primary windings 11 and 11' of respective signal transformers 10, 10', and through an energy measuring device 32. Resistors 14 and 14' are connected in parallel with secondary windings 12 and 12' of the signal transformers 10 and 10', respectively, and are connected to a receiver 13 comprising a summing circuit 15, a comb filter 17 and a threshold and amplifier circuit 18 having outputs 19 and 20.

Before discussing the mode of operation of the circuit shown in FIG. 2, FIGS. 3 and 4 will be described.

Figure 3:
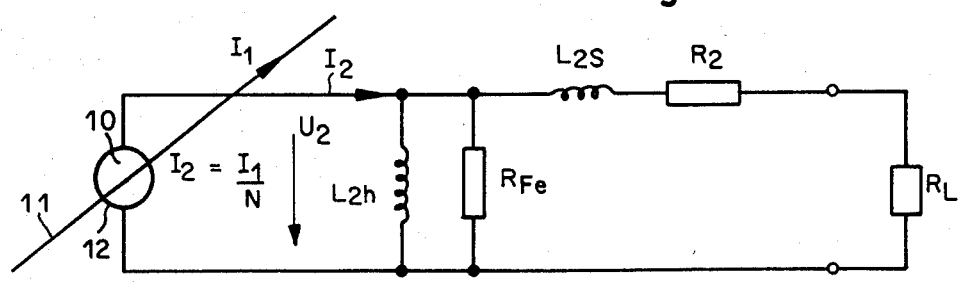
FIG. 3 shows an equivalent circuit diagram.
Figure 4:
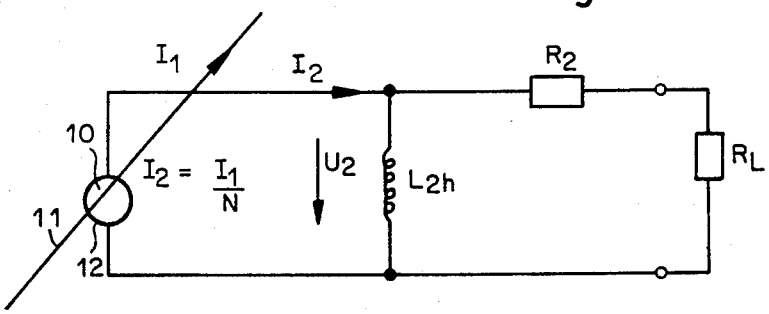
FIG. 4 shows a simplified equivalent circuit diagram.

FIG. 3 shows a simplified equivalent circuit diagram of a single signal transformer 10, in a form of a current transformer which is connected to a current transformer 6 in FIG. 2, in one phase of the medium voltage level. In this arrangement, the primary winding 11 of the signal transformer 10, which is associated with the respective single phase R, S, or T, is illustrated in the form of a single line through which flows the current $I_1$ of the respective phase. The current $I_1$ gives rise to a current $I_2$ being given by the relationship:

$$I_2=I_1/N,$$

where N denotes the ratio between the number of turns of the primary winding 11 to the number of turns of the secondary winding 12. The current $I_2$ flows through the secondary winding 12, which has a main inductance $L_{2h}$ and leakage inductance $L_{2s}$, through the load resistance (copper loss) $R_2$ of the secondary winding 12, and through the load resistance $R_L$ of the signal transformer 10. Arranged parallel to the main inductance $L_{2h}$ is a resistance $R_{Fe}$ representing the iron loss of the signal transformer 10.

Because of the low level of losses in the iron core of the signal transformer 10, the iron loss resistance $R_{Fe}$ can be considered as being of high value and can be disregarded. In addition, the secondary winding 9 of the current converter 6 is assumed to have only a low level of stray or leakage inductance $L_{2s}$. On those assumptions, the equivalent circuit diagram shown in FIG. 4 can apply, with the main inductance $L_{2h}$ and the ohmic resistance $R_2$ of the secondary winding 12 of the signal transformer 10 and the load resistance $R_L$ together with the associated parameters $I_1$, $I_2$ and the voltage $U_2$ across the secondary winding 9.

The secondary winding 12 of the signal transformer 10 is chosen to be of such a size that the main inductance $L_{2h}$, together with the resistance $R_2$ of the secondary winding 12 and the load resistance $R_L$, represents a high-pass filter with a limit or corner frequency equal to the lowest frequency which is to be transmitted. In this connection, the expression "limit frequency" $f_c$ defines the frequency at which there is a drop in the signal voltage $U_2$ of 3 db. Therefore, for example, with a preferred frequency range of wide-band signals to be transmitted of 1 to 25 kHz, the limit frequency should be 1 kHz or thereabouts. Approximately 5 kHz can be selected as the limit or lowermost frequency $f_c$ for signal transmissions from the low voltage level 4 in FIG. 2 to the medium voltage level 2. The limit frequency $f_c$ is calculated in accordance with the following equation:

$$f_c = \frac{1}{2\pi} \cdot \frac{R_2 + R_L}{L_{2h}} \tag{6}$$

Therefore, in accordance with equation (6), the secondary winding 12 of the signal transformer 10 together with its load resistance $R_L$ is to be dimensioned with reference to the specified limit frequency $f_c$ of the signals to be transmitted. The following equation (7) forms the basis for the current $I_2$ which flows through the secondary winding 12, which acts as a decoupling member and filter, of the signal transmitter 10:

$$I_2 = \frac{U_2}{jwL_{2h}} + \frac{U_2}{R_2 + R_L} \tag{7}$$

The voltage $U_2$ involved can be calculated therefrom, in accordance with equation (8):

$$U_2 = \frac{I_2}{\frac{1}{R_2 + R_L} + \frac{1}{jwL_{2h}}} \tag{8}$$

The coupling between the primary winding 11, which is shown as a single conductor, and the secondary winding 12 of the signal transmitter, is generally sufficiently loose, when it is in the form of a current converter, to ensure a good filter action with a desired voltage drop of for example 40 db for the main frequency (50 Hz) relative to the useful signal. If desired, the iron core of the current converter may have a small gap, with corresponding stray or leakage inductance $L_{2s}$ which can still be disregarded in establishing the dimensions in accordance with equation (6), as shown in FIG. 3. With sufficient coupling, at the signal frequency, that ensures a certain possibility of adjustment in regard to the frequency $f_c$.

When greater distances are involved, in particular in the medium voltage level 2, a plurality of current transformers 6, 6' can be arranged in the different phases R, S and T or in a different branch lines. That kind of decoupling is used in FIG. 2. When using decoupling of that kind, the currents $I^*_S$, $I^*_T$ of the secondary windings 12 and 12' of the individual signal transformers 10 and 10' are added or, in particular cases, subtracted.

In similar manner, one or more voltage transformers 7 may be coupled to two or more phases in one or more transmission lines in the medium voltage level 2 or the low voltage level 4. With a single voltage transformer 7, the simplified equivalent circuit diagram shown in FIG. 4 can also be utilized for the purposes of ascertaining the size of the decoupling action and the high-pass filter effect. The coupling between the primary and secondary windings in voltage transformers, which is naturally very close, must of course be reduced in that case by an air gap core in order to achieve a loose coupling. The resulting stray or leakage inductance $L_{2s}$ is to be taken into account in establishing dimensions in that case. When there are a plurality of voltage transformers 7, it is also possible to use a summing circuit which is described hereinafter.

In arrangement shown in FIG. 2 is intended for decoupling preferably wide-band audio frequency signals which are impressed in a heteropopular manner at a low voltage level, with a frequency range of between 1 and 25 kHZ, from a medium voltage level 2 which is connected to the low voltage level 4 in FIG. 1 by means of the distribution transformer 1. The current transformers 6 and 6', which are connected into the phase lines carrying the currents $I_{S\Delta}$ and $I_{T\Delta}$, preferably comprise current clamps or tongs which embrace the respective conductor, or a current transformer which is specifically designed for that purpose, with primary windings 8 and 8' and secondary windings 9 and 9' through which flow the current of one phase, for example the current $I'_{S\Delta}$ of the phase S, and the current of the second phase, for example, the current $I'_T$ of the second phase T, in the same direction. The two currents $I^*_{S\Delta}$, $I^*_{T\Delta}$ which are proportional to the currents $I_{S\Delta}$ and $I_{T\Delta}$ of the phases $S\Delta$ and $T\Delta$, are taken from the secondary windings 12 and 12' of the signal transformer 10.

The size of each of the secondary windings 12 and 12' of the corresponding signal transformer 10, 10' in such that the main inductance $L_{2h}$ with the ohmic resistance $R_2$ of the secondary windings 12 and 12' and the distributed load resistance $R_L$ in the summing circuit 15 in the receiver 13 respectively form a high pass filter having the desired limit frequency $f_c$.

The currents $I^*_{S\Delta}$, $I^*_{T\Delta}$ are supplied to the receiving circuit 13. Respective voltages are derived from the currents $I^*_{S\Delta}$, $I^*_{T\Delta}$, by the resistors 14 and 14'. These voltages are summed in a summing circuit 15 which is described in greater detail hereinbelow with reference to FIG. 5. An output 16 of the circuit 15 produces a voltage; the already heavily attenuated mains frequency and the higher harmonics thereof are filtered out of the voltage at the output 16, in known manner, by means of the comb filter 17, and the remaining signal is passed through the threshold and amplifier circuit 18 to the outputs 19 and 20 which actuate an evaluation circuit (not shown). The comb filter 17 may comprise a small number of members and thus be simplified, or possibly entirely omitted.

It will be appreciated that the currents from one or two other phases of the low voltage or medium voltage level, for example $R\Delta$ and $S\Delta$ or $R\Delta$ and $T\Delta$, or from three phases of the medium voltage level 2, may be detected and decoupled in the same manner.

In this respect, it is particular advantageous that the current transformers 6 which are required for an energy measuring device 32 in the medium voltage level, or voltage transformers (not shown), can be used at the same time for decoupling the audio frequency signals which go from the low voltage level 4 against the direction of energy flow. However, the decoupling effect may also be produced naturally without such an energy measuring device 32 at another location in the low voltage level 4 or medium voltage level 2 in FIG. 1.

Figure 5:
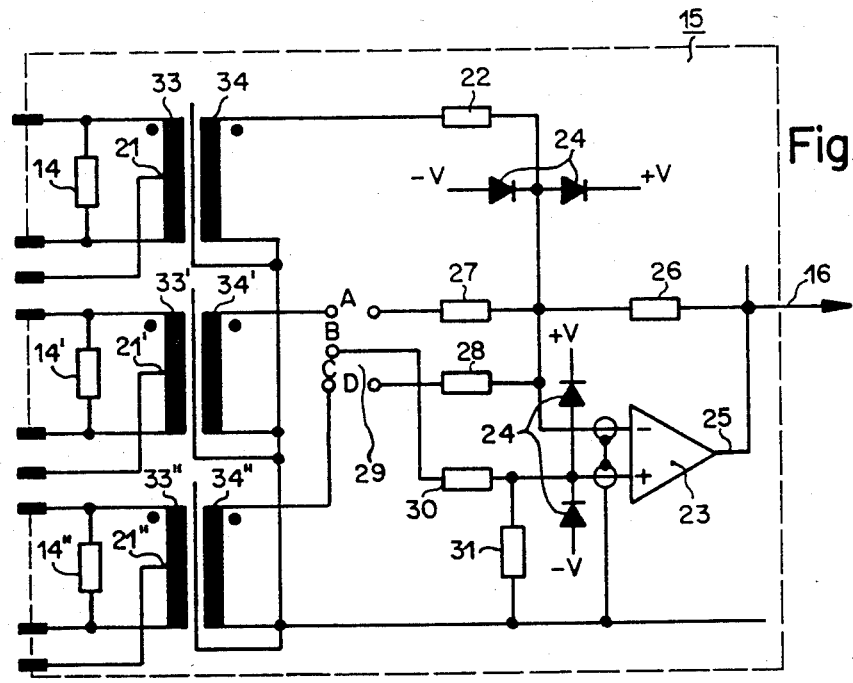
FIG. 5 shows an amplifier in a summing circuit.

FIG. 5 shows the summing circuit 15 in the receiver 13, in detailed form. It is capable of operating from three phases R, S and T of the medium voltage level 2. It will be appreciated that for supplying it with signal power, it is necessary to employ the current transformers 6, 6' shown in FIG. 2, together with a third current transformer 6" (not shown), and third signal transformer (not shown) which is indicated herein at 10". The summing circuit 15 has, for example, three isolation transformers, primary windings 33, 33' and 33" of which are each provided with a respective central tapping 21, 21' and 21". They serve for rendering symmetrical earthing and providing protection against electric shock hazards in respect of that and the subsequent circuitry, and at the same time provide a reference potential. A secondary winding 34 which cooperates with the primary winding 33 is fixedly connected by means of a resistor 22 to an inverting (−) input of an operational amplifier 23 in the summing circuit, of which the high-resistance inverting (−) and non-inverting (+) inputs are protected by means of diodes 24 from any voltage peaks which are transmitted by the capacitance of the various transformers. A further resistor 26, which produces a negative feedback effect in known manner, is arranged between the inverting (−) input and an output 25 of the operational amplifier 23. The output 25 forms the output 16 of the summing circuit 15. Further resistors 27 and 28 are connected on the one hand to the inverting (−) input of the operational amplifier 23 and on the other hand to contacts in a contact panel or area 29, with switching paths A, B, C and D.

The non-inverting (+) input of the operational amplifier is connected on the one hand by way of a further resistor 30 to a further contact in the contact area or panel 29 and on the other hand to earth, by way of a resistor 31.

The mode of operation of the signal transformer 10 and its cooperation with the summing circuit 15 in the receiving circuit 13 is as follows:

The circuit shown in FIG. 5 has a number of functions. More specifically, one or more phase currents $I^*_{R\Delta}$, and $I^*_{S\Delta}$ and/or $I^*_{T\Delta}$ can be detected by means of the same isolation transformers, each having three primary windings 33, 33' and 33" and secondary windings 34, 34' and 34". In that arrangement the resistors 14, 14', or 14" and the resistors 22, 27, 28 and 30 and the resistances of connecting cable between the current transformer 6, 6' and the current transformer 6" (not shown) and the signal transformer 10, 10', and the signal transformer 10" (not shown) (see FIG. 2) and between the latter and the primary windings 33, 33' and 33" form the load resistances of the decoupling filter which, together with the other components, define the limit frequency thereof.

If there is only a single phase of a current transformer 6, or a single voltage transformer 7, the operational amplifier 23 operates as a simple amplifier in respect of the audio frequency signals. For that purpose, the primary winding 33 of the isolation transformer is supplied with the signal, the amplified signal appearing at the output 25 of the operational amplifier 23 and at the output 16 of the summing circuit 15. As shown in FIG. 2, the amplified signal is subjected to further processing by the comb filter 17 and the threshold and amplifier circuit 18 and can be taken off at one of the outputs 19 or 20 for evaluation purposes. In that simple case, therefore, the summing circuit 15 has only an amplifier action.

The summing circuit 15 is even more advantageous in action if two or more phase currents from a medium voltage level 2 or from a low voltage level 4 are detected by means of a plurality of current transformers 6 or voltage transformers 7 in FIG. 1. In that case, a plurality of the primary windings 33, 33' and 33" are supplied with the voltages across the above-mentioned resistors 14, 14' and 14". In that arrangement, the secondary winding 34 is always connected by way of the resistor 22 to the inverting (−) input of the operational amplifier 23. If two current transformers 6 or 6' or a further current transformer 6" (not shown in FIG. 2) are used, the switching paths A or D in the contact arrangement 29 are short circuited so that the voltage of the secondary winding 34 is added to those of the secondary windings 34' or 34". When using three current transformers 6, 6' and a further current transformers 6" (not shown in FIG. 2), the paths A and C are short-circuited so that the voltages of the secondary windings 34 and 34' are summed and the voltage of the secondary winding 34" is subtracted.

Finally, in the contact arrangement 29, under particular mains conditions, subtraction operations in respect of the signal voltages can be effected when using only two transformers 6, 6' or 6, 6", with the voltages of the secondary windings 34 and 34' or 34", by short-circuiting the switching paths B or C.

The connection between the transformers 6, 7 and the signal transformer or between the latter and the receiver circuit 13 or between the summing circuit 15 and the other circuit portions of the receiver circuit 13, if those are disposed at a remote location, can be effected by means of shielded wire, to provide protection from stray effects which are extraneous to the useful signal. In that latter case, the d.c. voltage supply can also be by way of that cable.

Therefore, by virtue of the construction of the current transformer 6 or the voltage transformer 7, together with a small number of passive circuit components, the present arrangement makes it possible at the same time to form a decoupling filter, wherein preferably the current or voltage transformers which are already present for supplying energy measuring devices 32 in the central station of the respective level can also be used. This results in significant simplification in regard to design and assembly. By virtue of the configuration of the summing circuit 15, in conjunction with the contact arrangement 29, it is possible to effect signal processing which is suited to all needs.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A receiver circuit for decoupling audio frequency signals from an alternating current distribution network, said signals being in a frequency range whose lowest most value is $f_c$, said network including at least a first transformer comprising primary and secondary windings, said receiver being coupled to said network by way of a primary winding of a second transformer, said primary winding of said second transformer being coupled to the secondary winding of said first transformer, said receiver comprising
(a) a secondary winding of said second transformer, said secondary winding of said second transformer having an inductance and an ohmic resistance; and
(b) a load resistance connected to said secondary winding of said second transformer, said ohmic resistance, said inductance, and said load resistance being adapted to form a high pass filter capable of passing frequencies in said range including said lowest most frequency $f_c$.

2. A receiver as claimed in claim 1, wherein said first transformer is connected to at least one phase of a low voltage level of said network.

3. A receiver as claimed in claim 1, wherein said first transformer is connected to at least one phase of a medium voltage level of said network.

4. A receiver as claimed in claim 1, wherein the secondary winding of said second transformer is dimensioned with reference to the lowermost frequency $f_c$, where $f_c$ is equal to:

$$\frac{1}{2\pi} \frac{R_2 + R_L}{L_{2h}}$$

and where $R_2$ is the ohmic resistance of the secondary winding of said second transformer, $L_{2h}$ is the inductance of the secondary winding of said second transformer, and $R_L$ is the load resistance of said second transformer.

5. A receiver as claimed in claim 4 wherein said high pass filter is designed to operate at a lowermost frequency of 1000 Hertz.

6. A receiver as claimed in claim 4 wherein said high pass filter is designed to operate at a lowermost frequency of 5000 Hertz.

7. A receiver as claimed in claim 1 wherein said first transformer is either a voltage transformer or a current transformer.

8. A receiver as claimed in claim 1, wherein said network includes a plurality of current transformers or voltage transformers arranged in or between a plurality of phase wires.

9. A receiver as claimed in claim 1, wherein said second transformer is formed with an air gap for a weakened coupling.

10. A receiver as claimed in claim 1, comprising:

a summing circuit connected to said second transformer wherein said summing circuit functions in the receiver selectively as a single amplifier, adder or subtractor together with closed switching paths in a contact panel.

11. The receiver of claim 10 wherein said first and second transformers are connected by shielded wire and wherein said second transformer and said summing circuit are connected by shielded wire.

* * * * *